United States Patent
Chiriac et al.

(10) Patent No.: US 11,168,379 B2
(45) Date of Patent: Nov. 9, 2021

(54) PRE-CONDITIONED ALSIFE COATING OF BORON STEEL USED IN HOT STAMPING

(71) Applicant: Ford Motor Company, Dearborn, MI (US)

(72) Inventors: Constantin Chiriac, Windsor (CA); Raj Sohmshetty, Canton, MI (US); Elizabeth Bullard, Royal Oak, MI (US); James Engle, Chesterfield, MI (US); Stephen Kernosky, Livonia, MI (US)

(73) Assignee: Ford Motor Company, Dearborn, MI (US)

(*) Notice: Subject to any disclaimer, the term of this patent is extended or adjusted under 35 U.S.C. 154(b) by 665 days.

(21) Appl. No.: 15/894,763

(22) Filed: Feb. 12, 2018

(65) Prior Publication Data
US 2019/0249271 A1   Aug. 15, 2019

(51) Int. Cl.
*C21D 9/56* (2006.01)
*C21D 8/02* (2006.01)
*B21D 22/02* (2006.01)
*C21D 1/42* (2006.01)
*C21D 1/26* (2006.01)

(52) U.S. Cl.
CPC .......... *C21D 9/56* (2013.01); *B21D 22/022* (2013.01); *C21D 1/26* (2013.01); *C21D 1/42* (2013.01); *C21D 8/0221* (2013.01); *C21D 8/0247* (2013.01)

(58) Field of Classification Search
None
See application file for complete search history.

(56) References Cited

U.S. PATENT DOCUMENTS

| 8,066,829 B2 | 11/2011 | Spehner et al. |
| 8,992,704 B2 | 3/2015 | Maki et al. |
| 2010/0300584 A1 | 12/2010 | Buschsieweke et al. |
| 2015/0030382 A1 | 1/2015 | Cretteur et al. |
| 2017/0051371 A1 | 2/2017 | Chauvin et al. |
| 2017/0100915 A1* | 4/2017 | Tokuda ............. C22C 18/00 |

(Continued)

FOREIGN PATENT DOCUMENTS

| WO | 2011/104443 | 9/2011 |
| WO | 2017/006144 | 1/2017 |

OTHER PUBLICATIONS

Wieczorek et al., "Bonding Strength of Hot-Formed Steel with an AlSi Coating and Approaches to Improve It by Laser Surface Engineering", L.F.M. da Silva (ed.), Materials Design and Applications, Advanced Structured Materials 65, DOI 10.1007/978-3-319-50784-2_29 (Year: 2017).*

(Continued)

*Primary Examiner* — Patricia L. Hailey
*Assistant Examiner* — Christopher D. Moody
(74) *Attorney, Agent, or Firm* — Burris Law, PLLC

(57) ABSTRACT

A process for pre-conditioning a hot stamped part is provided. The process includes continuously annealing a boron steel material having an aluminum coating for a predetermined time and at a predetermined temperature such that less than 10 weight % Iron (Fe) is in the aluminum coating and AlSi pockets are formed in the aluminum coating prior to a subsequent hot stamping process, wherein the predetermined time and temperature are a function of a thickness of the boron steel material.

20 Claims, 4 Drawing Sheets

(56) References Cited

U.S. PATENT DOCUMENTS

2017/0183754 A1    6/2017  Frost et al.
2019/0382875 A1*  12/2019  Branagan .............. C22C 38/02
2020/0017948 A1*   1/2020  Van Schoonevelt ..... C21D 1/26

OTHER PUBLICATIONS

Li, Nan. "Fundamentals of Materials Modelling for Hot Stamping of UHSS Panels With Graded Properties" Nov. 2013, Imperial College London. Retrieved from: https://spiral.imperial.ac.uk/bitstream/10044/1/29134/6/Li-N-2014-PhD-Thesis.pdf on Mar. 24, 2021 (Year: 2013).*

Wieczorek, A. et al., Bonding Strength of Hot-Formed Steel with an AlSi Coating and Approaches to Improve It by Laser Surface Engineering, In: Silva L. (eds) Materials Design and Applications Advanced Structured Materials, vol. 65 pp. 389-398, Springer, Cham, available at URL https://link.springer.com/chapter/10.1007/978-3-319-50784-2_29.

Liang, W. et al., Influence of heating parameters on properties of the Al—Si coating applied to hot stamping, Science China Technological Sciences, Jul. 2017, vol. 60(7), pp. 1088-1102, available at URL https://link.springer.com/article/10.1007/s11431-016-0231-y.

Grauer, S.J. et al., Investigation of melting in the Al—Si coating of a boron steel sheet by differential scanning calorimetry. Journal of Materials Processing Technology vol. 216, pp. 89-94, 2015, Elsevier Publishing, available at URL https://www.researchgate.net/publication/265910054_Investigation_of_melting_in_the_Al-Si_coating_of_a_boron_steel_sheet_by_differential_scanning_calorimetry.

Windmann M., et al., Laser Beam Welding of Aluminum to Al-base Coated High-Strength Steel 22MnB5, Journal of Meterials Processing Technology, 2014, available at URL http://dx.doi.org/doi:10.1016/j.jmatprotec.2014.10.026.

* cited by examiner

PRE-CONDITIONED ALSIFE COATING OF BORON STEEL USED IN HOT STAMPING

FIELD

The present disclosure relates to coatings for high strength steels in hot stamping processes.

BACKGROUND

The statements in this section merely provide background information related to the present disclosure and may not constitute prior art.

There is an increasing demand to reduce the weight of vehicle structures while meeting various strength and safety requirements, leading vehicle teams to investigate high strength steels. One category of high strength steels are Boron-based steels, with 22MnB5 grade steel with an Al—Si coating (Usibor® 1500 trade name from Arcelor Mittal) as an industry leading Boron-based steel. The Al—Si coated Boron-based steel is transported inside the furnace using ceramic rollers.

The roller hearth hot stamping process is considered to be an expensive process, and one reason is due to down-time from unplanned maintenance, such as broken rollers or "furnace jams." During the roller hearth hot stamping process, the aluminized boron steel blanks (blanks) are heated and part of the AlSiFe coating is melted. The melted AlSiFe coating can be transferred to the ceramic rollers, which is known as an "aluminum pick-up" of or on the ceramic rollers. The transferred AlSiFe coating diffuses into the ceramic roller leading to breakage of the ceramic roller due to an increase in residual stresses and brittleness of the ceramic roller. The aluminum pick-up also causes furnace jams because as the surface of the ceramic roller become less uniform the blanks or parts on the roller are non-uniformly loaded and "drift" on the surface of the rollers. The drift may be from side to side, a rotation or a combination as the blanks traverse the roller hearth. As the blanks drift within the roller hearth they are more likely to jam the roller hearth or be produced out of specification, both of which increase waste and costs.

Another issue with the current AlSiFe coating used in the hot stamping process is the heating rate of the AlSiFe coated boron steel blanks up to their austenitization temperature. When AlSiFe coated boron steel blanks are heated at rates above 12° C./s, the vaporization rate of the AlSiFe coating increases. Vaporization of the AlSiFe coating is undesirable for the furnace and to parts processed in the furnace for various reasons. Because of the potential vaporization of the AlSiFe coating, heating technologies such as high-pressure contact heating, induction heating, and laser heating cannot be applied when heating boron steel blanks. Accordingly, steel producers for AlSiFe coated boron steel recommend limiting heating rates below 12° C./s.

Current methods of addressing the transfer of the AlSiFe coating from the boron steel blanks to the ceramic rollers include using an hours-long two-stage heat treatment with slow heating rates (less than 12° C./s) to inhibit melting of the AlSiFe coating.

The present disclosure addresses the issue of "aluminum pick-up" on ceramic rollers in roller hearth hot stamping processes, among other issues related to coating high strength steels, and more specifically boron steel, in hot stamping processes.

SUMMARY

In one form of the present disclosure, a process for pre-conditioning a hot stamped part is provided. The process comprises continuously annealing a boron steel material having an aluminum coating for a predetermined time and at a predetermined temperature such that less than 10 weight % (wt. %) Fe is in the aluminum coating and AlSi pockets are formed in the aluminum coating prior to a subsequent hot stamping process, wherein the predetermined time and temperature are a function of a thickness of the boron steel material.

In various processes of the present disclosure, the Fe in the aluminum coating is between 7 wt. % and 10 wt. %, the boron steel part is in a form of a coil or a blank, and the continuous annealing comprises a continuous furnace line.

In other variations of the present disclosure, the predetermined time is less than 10 minutes, the predetermined temperature at an entrance zone of a furnace is at least 930° C. and below 750° C. at an exit zone of the furnace, and the predetermined time and temperature are such that the aluminum coating does not transfer to an equipment component of the hot stamping process during heating.

As a result of the processes disclosed herein, the boron steel part has a corrosion resistance greater than or equal to a non-preconditioned aluminized boron steel having the same composition.

In another form of the present disclosure, a process for producing a boron steel part having an aluminum coating is provided. The process comprises pre-conditioning a boron steel material by continuous annealing for a predetermined time at a predetermined temperature such that less such that less than 10 wt. % Fe is in the aluminum coating and AlSi pockets are formed in the aluminum coating. The process further includes the step of subsequently hot stamping the boron steel material into a part, and when, during heating of a blank that has been pre-conditioned, melting of the AlSi pockets does not occur.

In a variation of this process, the boron steel material is heated by at least one of high pressure contact heating, induction heating, and laser heating. Further, the boron steel material may be in a form of a coil prior to pre-conditioning and may subsequently be re-coiled prior to hot stamping.

In other variations, the boron steel material undergoes a tailored rolling coil process prior to the pre-conditioning step, the boron steel undergoes a welding coils process prior to the pre-conditioning step, and the hot stamping has a heating rate greater than 12° C./sec.

In yet another variation, the predetermined time and temperature are such that the aluminum coating does not transfer to an equipment component of the hot stamping. The equipment component may be a roller of a hearth furnace.

The present disclosure also includes parts formed by the various processes disclosed herein.

In yet another form of the present disclosure, a process for producing a part is provided. The process comprises forming a boron steel material with an aluminum coating, pre-conditioning the boron steel material with the aluminum coating by continuous annealing for a predetermined time at a predetermined temperature such that less than 10 wt. % Fe is in the aluminum coating and AlSi pockets are formed in the aluminum coating, and subsequently hot stamping the boron steel material into a part.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
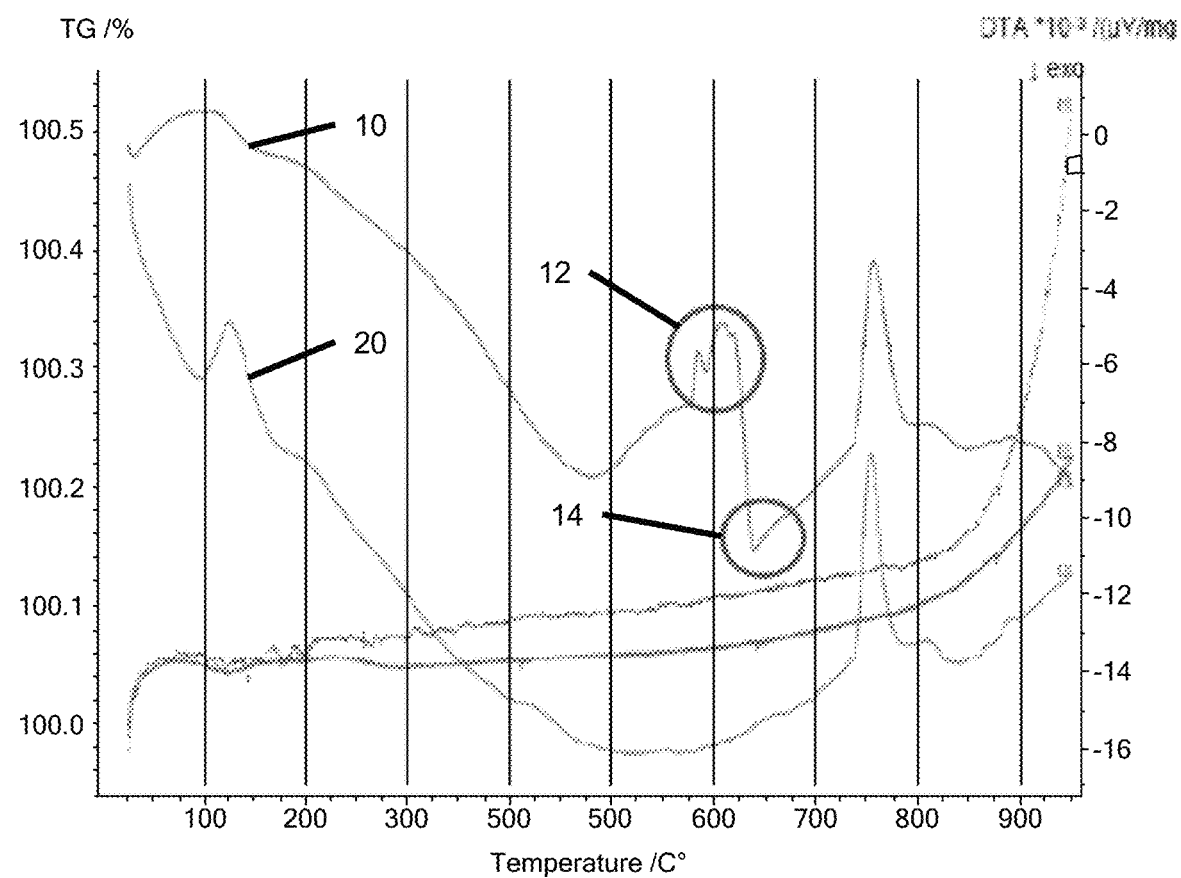
FIG. 1 illustrates Differential Scanning Calorimetry (DSC) analyses of AlSiFe coated boron steels according to the teachings of both the prior art and the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure addresses issues with processing coatings in hot stamping processes by using boron steel blanks with a "pre-conditioned AlSiFe coating." Advantageously, the pre-conditioned AlSiFe coating according to the teachings of the present disclosure does not melt during the heating process of the roller hearth, or with other heating technologies. Generally, the pre-conditioned AlSiFe coating is enabled by a short continuous annealing cycle of the as-produced aluminized boron steel. The heating time for the short continuous annealing cycle of the present disclosure is in the range of minutes rather than a range of hours (and half hours) of the state of the art.

Referring to FIG. 1, a Differential Scanning Calorimetry (DSC) analyses of commercial AlSiFe coated boron steel 10 (commercial AlSiFe 10) and the pre-conditioned AlSiFe coated boron steel of the present disclosure (pre-conditioned AlSiFe 20) are shown.

For the DSC analyses, the commercial AlSiFe sample 10 was heated to 930° C. As shown, the aluminized coating on the commercial AlSiFe sample 10 melts, in region 12, around 580-620° C. The aluminized coating then re-solidifies, in region 14, at around 640° C. This is the current industry process/standard.

While investigating the thermal processing of the commercial AlSiFe product, a surprising discovery was made. When the commercial AlSiFe material was cooled and then reheated to about 930° C., the aluminized coating did not remelt and was stable, as shown in FIG. 1, pre-conditioned AlSiFe. Thus, the pre-conditioned AlSiFe 20 of the present disclosure reduces or negates the melting of the aluminized coating up to about 930° C. As recorded and plotted in FIG. 1, pre-conditioned AlSiFe is enabled by the first heating cycle to at least about 640-800° C. and is not dependent upon a roller hearth.

However, when applied to the roller hearth hot stamping process for AlSiFe coated boron steel, the pre-conditioned AlSiFe coated boron steel of the present disclosure reduces or negates aluminum pick-up on the rollers and other equipment that pre-conditioned AlSiFe coated boron steel encounters. Reduction or negation of aluminum pick-up similarly reduces roller breakage, drift, jamming, maintenance, and their associated costs and waste.

Figure 2:
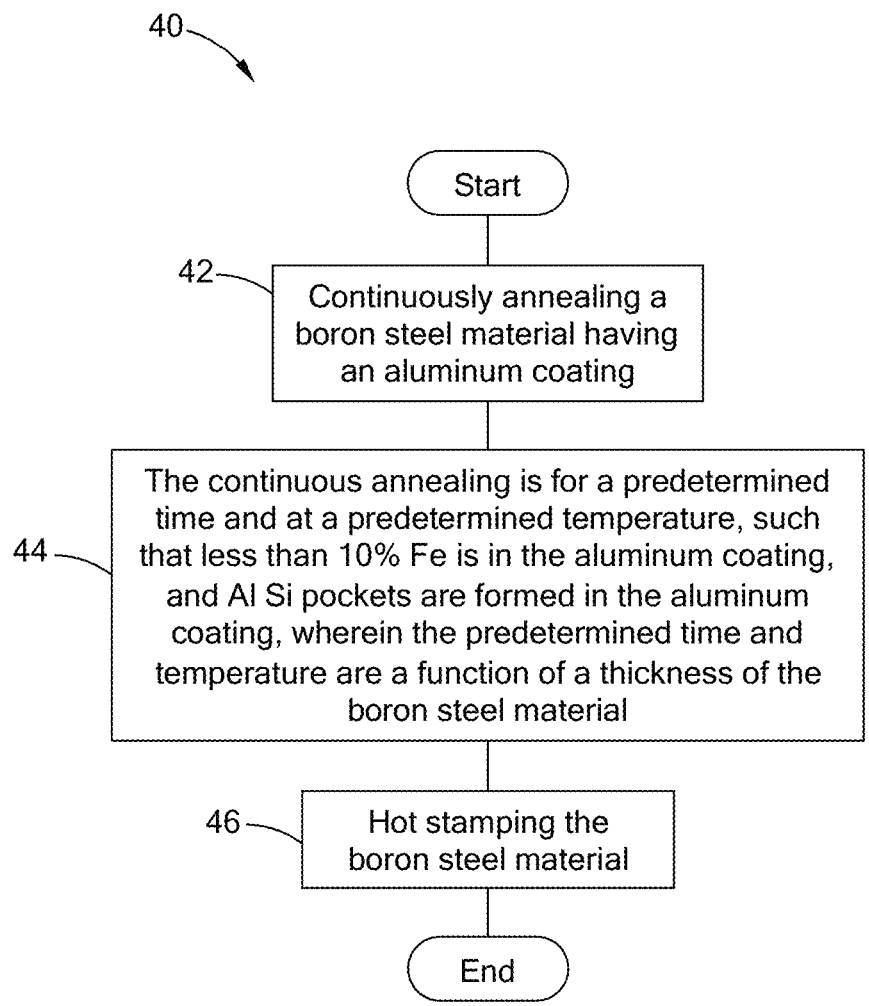
FIG. 2 is a flow diagram of a process for pre-conditioning a hot stamped part according to the teachings of the present disclosure.

Referring to FIG. 2, a process for pre-conditioning a hot stamped part 40 is provided. The process 40 comprises continuously annealing a boron steel material having an aluminum coating in step 42. The pre-conditioning is for a predetermined time and at a predetermined temperature such that less than 10 wt. % Fe is in the aluminum coating and AlSi pockets are formed in the aluminum coating 44 prior to a subsequent hot stamping process 50, wherein the predetermined time and temperature are a function of a thickness of the boron steel material. For example, in one form, the predetermined temperature is between 700° C.-750° C., and the predetermined time less than 10 minutes for a boron steel material having a thickness up to 2.5 mm.

In variations of the present disclosure, the Fe in the aluminum coating is between 7 wt. % and 10 wt. %, the boron steel part is in a form of a coil or a blank, and the continuous annealing comprises a continuous furnace line.

In other variations of the process, the predetermined time is less than 10 minutes, the predetermined temperature is at least 930° C. at an entrance zone of a furnace and below 750° C. at an exit zone of the furnace, and the predetermined time and temperature are such that the aluminum coating does not transfer to an equipment component of the hot stamping process. The aluminum coating does not transfer to an equipment component of the hot stamping process when the boron steel material is heating during the stamping process.

In another process of the present disclosure, the boron steel part has a corrosion resistance greater than or equal to a non-preconditioned aluminized boron steel having the same composition.

Figure 3:
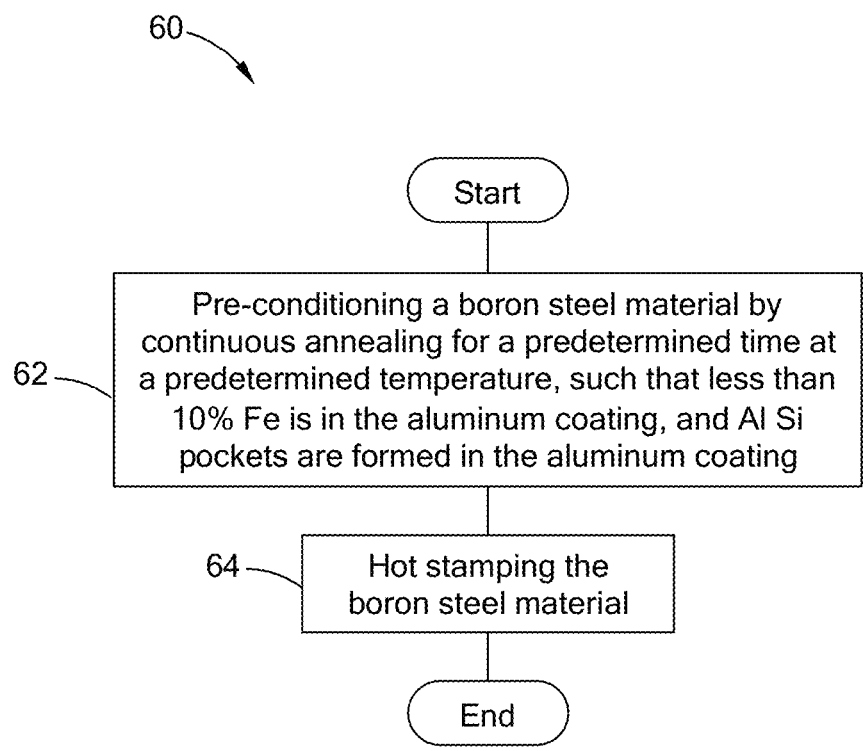
FIG. 3 is a flow diagram of another process for producing a boron steel part having an aluminum coating according to the teachings of the present disclosure.

Now referring to FIG. 3, another process for producing a boron steel part having an aluminum coating 60 is provided. The process 60 comprises pre-conditioning a boron steel material by continuous annealing for a predetermined time at a predetermined temperature, temperature such that less such that less than 10 wt. % Fe is in the aluminum coating and AlSi pockets are formed in the aluminum coating 62. The process 60 subsequently hot stamps the boron steel material (which in one form is a blank) into a part 64.

In a variation of this process, the boron steel material is heated by at least one of high pressure contact heating, induction heating, and laser heating.

In variations of the processes of the present disclosure, the boron steel material is in a form of a coil prior to pre-conditioning and may subsequently be re-coiled prior to hot stamping. In another form, the boron steel material undergoes a tailored rolling coil process prior to the pre-conditioning step. In still another form, the boron steel material undergoes a welding coils process prior to the pre-conditioning step.

In one form, the hot stamping has a heating rate greater than 12° C./sec.

In yet another process of the present disclosure, the predetermined time and temperature are such that the aluminum coating does not transfer to an equipment component of the hot stamping. In this form, the equipment component is a roller of a hearth furnace.

Figure 4:
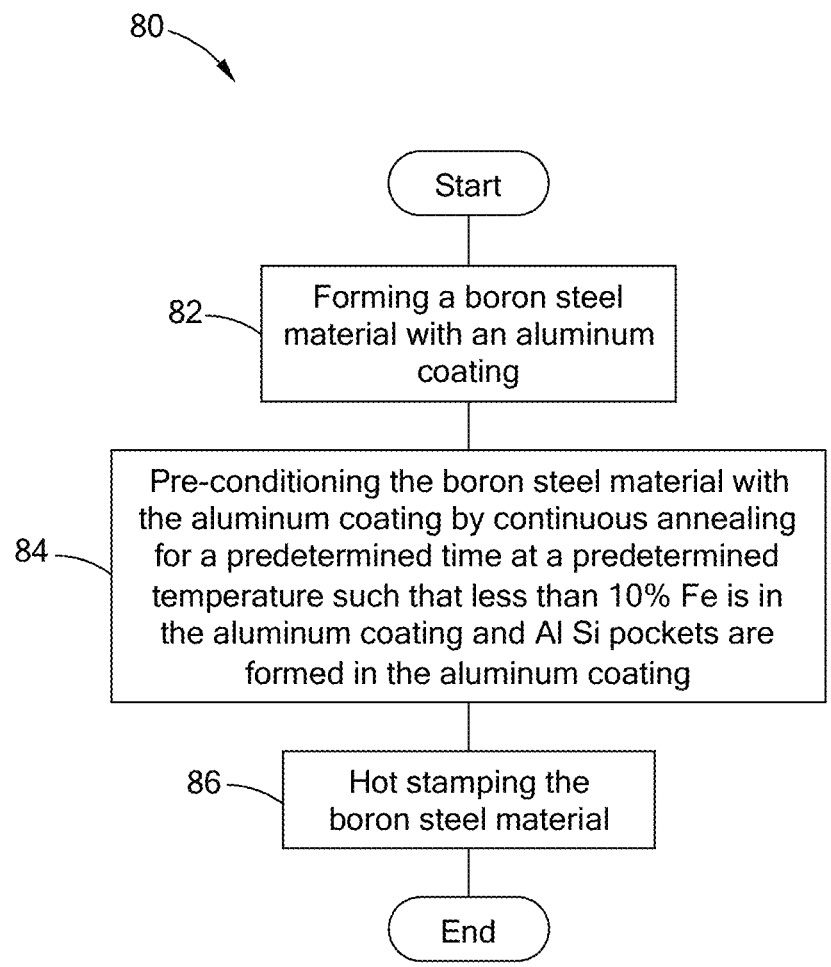
FIG. 4 is a flow diagram of still another process for producing a part and also having an aluminum coating according to the teachings of the present disclosure.

Now referring to FIG. 4, yet another process for producing a part according to the teachings of the present disclosure is shown. This process comprises forming a boron steel material with an aluminum coating, pre-conditioning the boron steel material with the aluminum coating by continuous annealing for a predetermined time at a predetermined temperature such that less than 10 wt. % Fe is in the aluminum coating and AlSi pockets are formed in the aluminum coating, and subsequently hot stamping the boron steel material into a part.

The pre-conditioned AlSiFe coating of the present disclosure reduces and mitigates furnace downtime due to replacing damaged ceramic rollers. The present disclosure also reduces and mitigates drifting of blanks and associated furnace downtime due to blank jams. Further, the present disclosure reduces or negates hydrogen embrittlement during furnace heating-cooling, reducing delay cracking of the steel blanks and components of the roller hearth hot stamping equipment.

In accordance with the teachings herein, different heating schedules in terms of time-temperature-transformation can be developed based on capabilities of the various continuous annealing lines.

Water vapor is a component of many furnace atmospheres, including the atmosphere of a hot stamping process. Desired levels of water vapor (the dew point temperature, or simply the dew point) vary depending on the process, metals used, and other furnace gases, among other process variables. The dew point varies between different furnace zones, with dew point temperatures from −70 to 10° C. (−94 to 50° F.) being common in heat treatment. The dew point is often actively modified or tailored by adding dry air, gas generation, or gas mixing, but the dew point is also influenced by furnace design and the weather. Advantageously, the present disclosure enables higher furnace dew points by reducing the number and types of volatiles in the furnace atmosphere. A higher dew point reduces furnace controls (e.g. dry air, gas generation, or gas mixing) and reduces operation costs over traditional methods.

The present disclosure also enables shorter times at temperature (soaking time) for a given thickness of material with respect to traditional methods. Shorter soaking times reduce operational costs as well as enable faster processing rates.

As the present disclosure reduces or negates vaporization, other heating technologies such as laser heating, induction heating, and high pressure contact heating are enabled for hot stamping of aluminized boron steel without damaging the aluminized coating.

Further, the present disclosure reduces the capital investment costs for the equipment used/required for hot stamping research, development, and production of various coatings and blank materials.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A process for pre-conditioning a hot stamped part comprising continuously annealing a boron steel material having an aluminum coating for a predetermined time and at a predetermined temperature such that less than 10 weight % Fe is in the aluminum coating and AlSi pockets are formed in the aluminum coating prior to a subsequent hot stamping process, wherein the predetermined time and temperature are a function of a thickness of the boron steel material.

2. The process according to claim 1, wherein the Fe in the aluminum coating is between 7 weight % and 10 weight %.

3. The process according to claim 1, wherein the boron steel material is in a form of a coil or a blank.

4. The process according to claim 1, wherein the continuous annealing comprises a continuous furnace line.

5. The process according to claim 1, wherein the predetermined time is less than 10 minutes.

6. The process according to claim 1, wherein the predetermined temperature at an entrance zone of a furnace is at least 930° C. and below 750° C. at an exit zone of the furnace.

7. The process according to claim 1, wherein the predetermined time and temperature are such that the aluminum coating does not transfer to an equipment component of the subsequent hot stamping process during heating.

8. The process according to claim 1, wherein the boron steel material has a corrosion resistance greater than or equal to a non-preconditioned aluminized boron steel having the same composition.

9. A process for producing a boron steel part having an aluminum coating comprising:

pre-conditioning a boron steel material by continuous annealing for a predetermined time at a predetermined temperature such that less than 10 weight % Fe is in the aluminum coating and AlSi pockets are formed in the aluminum coating, wherein the predetermined time and temperature are a function of a thickness of the boron steel material; and subsequently hot stamping the boron steel material into a part.

10. The process according to claim 9, wherein the boron steel material is heated by at least one of high pressure contact heating, induction heating, and laser heating.

11. The process according to claim 9, wherein the boron steel material is in a form of a coil prior to pre-conditioning and is subsequently re-coiled prior to hot stamping.

12. The process according to claim 9, wherein the boron steel material undergoes a tailored rolling coil process prior to the pre-conditioning step.

13. The process according to claim 9, wherein the boron steel material undergoes a welding coils process prior to the pre-conditioning step.

14. The process according to claim 9, wherein a heating rate of the hot stamping is greater than 12° C./sec.

15. The process according to claim 9, wherein the predetermined time and temperature are such that the aluminum coating does not transfer to an equipment component of the hot stamping.

16. The process according to claim 15, wherein the equipment component is a roller of a hearth furnace.

17. The process according to claim 9, wherein the Fe in the aluminum coating is between 7 weight % and 10 weight %.

18. A part formed by the process of claim 9.

19. The part according to claim 18, wherein the part has a corrosion resistance greater than or equal to a non-preconditioned aluminized boron steel having the same composition.

20. A process for producing a part comprising:

forming a boron steel material with an aluminum coating;

pre-conditioning the boron steel material with the aluminum coating by continuous annealing for a predetermined time at a predetermined temperature such that less than 10 weight % Fe is in the aluminum coating and AlSi pockets are formed in the aluminum coating, wherein the predetermined time and temperature are a function of a thickness of the boron steel material; and subsequently hot stamping the boron steel material into a part.

\* \* \* \* \*